United States Patent
Boisvert et al.

(10) Patent No.: US 7,053,498 B1
(45) Date of Patent: May 30, 2006

(54) ELECTRONIC CONTROL FOR A HYDRAULICALLY DRIVEN GENERATOR

(75) Inventors: Mario P. Boisvert, Reed City, MI (US); Randall L. Perrin, Grawn, MI (US); Marvin E. Puska, Marion, MI (US); John E. Mitchell, Newaygo, MI (US)

(73) Assignee: Wartron Corporation, Reed City, MI (US)

( * ) Notice: Subject to any disclaimer, the term of this patent is extended or adjusted under 35 U.S.C. 154(b) by 13 days.

(21) Appl. No.: 11/037,984

(22) Filed: Jan. 18, 2005

(51) Int. Cl.
*F01D 15/10* (2006.01)

(52) U.S. Cl. .................... 290/40 R; 290/40 C; 290/17; 290/40 A; 290/40 B; 322/16; 180/165; 180/65.2

(58) Field of Classification Search .............. 290/40 C, 290/17, 40 R, 40 B; 322/16; 180/165, 65.2
See application file for complete search history.

(56) References Cited

U.S. PATENT DOCUMENTS

| | | | |
|---|---|---|---|
| 3,941,016 A | | 3/1976 | Will |
| 4,287,429 A | | 9/1981 | Bashnin et al. |
| 4,754,156 A | * | 6/1988 | Shiozaki et al. ............... 290/52 |
| 4,920,277 A | * | 4/1990 | Kuwabara et al. ........ 290/40 C |
| 5,028,221 A | | 7/1991 | Malfit |
| 5,410,943 A | | 5/1995 | Kervagoret |
| 5,421,705 A | | 6/1995 | Benckert |
| 6,394,206 B1 | * | 5/2002 | Fury .......................... 180/53.4 |
| 6,677,685 B1 | * | 1/2004 | Pfleger et al. ............ 290/40 C |
| 6,781,350 B1 | * | 8/2004 | Iwatani et al. ................. 322/27 |

* cited by examiner

*Primary Examiner*—Darren Schuberg
*Assistant Examiner*—Iraj A. Mohandesi
(74) *Attorney, Agent, or Firm*—Brooks Kushman P.C.

(57) ABSTRACT

Electronic control for a hydraulic system driving an auxiliary power source is provided, with specific application as a system for controlling the operation of a hydraulically driven AC generator. The system may includes a hydraulic pump, a hydraulic motor drivably connected to the generator, a fluid circuit for circulating fluid from the pump to the motor and back. The fluid circuit may contain a bypass conduit to bypass the motor. The system also includes a proportional servo control valve assembly for controlling the fluid circuits and a control circuit for controlling the proportional control valve assembly. The control system can be capable of controlling the flow of hydraulic fluid to the motor powering the electrical or mechanical system. Sensors for measuring the operating parameters of the system and an operator interface module can influence the operation of the system.

19 Claims, 4 Drawing Sheets

ELECTRONIC CONTROL FOR A HYDRAULICALLY DRIVEN GENERATOR

BACKGROUND OF THE INVENTION

1. Field of the Invention

The present invention is directed to an electronic control for hydraulic system, and more particularly to precision control of hydraulically driven generators for stabilizing frequency and voltage output characteristics.

2. Background Art

Most engine driven vehicles utilize an internal combustion engine as the primary power source for propelling a vehicle. However, numerous modules and devices for the vehicle as well as the engine require electrical power. Typically, a rechargeable battery is provided with the vehicle as a basic power supply. The battery power supply system provides direct current (DC) electrical power for starting the vehicle engine and for operating certain DC compatible electrical loads when the vehicle is not running. The battery is recharged to maintain power by an alternator coupled to and driven by the engine when the vehicle is running. Concurrently, the alternator also provides DC electrical power to the vehicle electrical loads.

With the advent of electronics in today's modern vehicle, ground vehicles, boats and aircraft alike, the amount of electrical loads which require power has significantly increased. Moreover, many various auxiliary electrical loads are dependent upon stable alternating current (AC), for example, rescue and military vehicles having AC powered communications equipment. Additionally, many other vehicles, such as utility and telephone company repair and maintenance vehicles and vehicles providing electrical welding equipment, are increasingly utilizing AC equipment dependent upon clean AC power.

Various systems have been proposed for alleviating the complication of operating both AC and DC powered electrical equipment. One such system involves driving an auxiliary AC generator from the vehicle's engine or principal power plant. This can be accomplished by connecting the generator to a power take off or to any other suitable connection to engine output. While this will indeed operate a generator, variations in engine speed will wreak havoc with characteristics of power output and therefore with equipment which is dependent upon stable voltage and frequency characteristics of electrical power.

Accordingly, various systems have been proposed to control speed of an AC generator. One such system utilizes a hydraulic circuit having a proportional valve for supplying a constant rate of fluid flow to a hydraulic motor. The hydraulic motor in turn drives a generator for supplying AC power to certain AC compatible electrical loads. However, such systems can have difficulty maintaining precise frequency output for controlling the most sensitive AC equipment and are often susceptible to premature mechanical failure.

SUMMARY OF THE INVENTION

Accordingly, it is an aspect of the present invention to provide a hydraulic control system for generating precise electrical output characteristics, particularly frequency output, along with prolonging the life of the system, thus reducing warranty returns and costs associated therewith.

A hydraulic control system for driving an auxiliary power source, located aboard a motor vehicle having a primary power source, at constant speed despite fluctuations in rotational speed of the primary power source is provided. The system may include a hydraulic pump, a hydraulic motor, a fluid circuit, a proportional control valve assembly, and a control circuit. The hydraulic pump may be drivably connectable to the primary power source and can have an inlet for receiving fluid for pumping and an outlet for discharging pumped fluid under pressure. The hydraulic motor may be drivably connectable to the auxiliary power source and can have an inlet for receiving fluid under pressure and an outlet for discharging spent fluid. The fluid circuit may include a supply conduit for conducting fluid discharged by the pump to the motor, a return conduit for returning fluid discharged by the motor to the pump, and a bypass conduit for conducting fluid discharged by the pump directly to the return conduit, bypassing the motor, and returning fluid to the pump.

The proportional control valve assembly can be disposed serially with respect to the supply conduit and interposed between the outlet of the pump and the inlet of the motor. The control valve assembly may have a housing including a valve chamber, a valve disposed within the valve chamber for apportioning the flow of fluid between the supply conduit and the bypass conduit, a solenoid drivably connectable to the valve for selectively moving the valve incrementally within the valve chamber from an open position to a closed position. Moreover, a first fluid passage may be provided in fluid communication with the valve chamber and the supply conduit going to the motor, while a second fluid passage may be provided in fluid communication with the valve chamber and the bypass conduit. The valve can selectively close and open the first fluid passage and the second fluid passage proportionally dividing the flow of fluid therebetween.

The control circuit may be in electrical communication with the valve assembly for controlling the valve assembly and hence the fluid flow within the first fluid passage to the motor supply conduit and the second fluid passage to the bypass conduit. Further, the control circuit may include a sensor electrically coupled to the auxiliary power source for determining output frequency of the auxiliary power source. A reference signal generator for generating a reference signal indicative of a predetermined output frequency may also be provided. Additionally, the control circuit can include a comparing subcircuit for comparing sensed output frequency with the reference signal, and for generating a control signal controlling the valve assembly such that the supply of fluid conducted to the supply conduit be sufficient to maintain desired output frequency.

Moreover, the control circuit of the hydraulic control system may further include a temperature sensor disposed in the fluid circuit for sensing hydraulic fluid temperature. A system controller having a fluid pre-heating subcircuit may be provided for generating a control signal controlling the valve assembly such that fluid bypasses the hydraulic motor entirely until safe fluid temperature is obtained. Further, the system controller may further include a power ramping subcircuit for generating a control signal controlling the valve assembly when sufficient fluid temperature is obtained such that power is supplied gradually to the hydraulic motor.

Furthermore, the system controller may include an overtemperature shutdown subcircuit for generating a control signal controlling the valve assembly when fluid temperature becomes too hot for safe operation such that fluid bypasses the hydraulic motor, shutting down the auxiliary power source. Additionally, the control circuit can be equipped with an emergency override accessible by an operator for instructing the system controller to continue system operation when unsafe operating conditions exist.

It is another aspect of the present invention to provide a hydraulic control system that senses fluid pressure in the fluid circuit and automatically engages the auxiliary electrical system to power certain electrical loads, provided safe operating temperatures are obtained.

Accordingly, the control circuit of the hydraulic control system may further include a pressure sensor for determining sufficient hydraulic pressure for commencing system operation. The pressure sensor can cause system operation to begin when hydraulic pressure is sufficient, and can, correspondingly, cause system operation to shut down when hydraulic pressure is deficient.

Yet another aspect of the present invention is to control operation of the hydraulic circuit to perform under safe operating conditions.

Therefore, a method, according to the invention, for operating a hydraulic control system may include sensing hydraulic fluid temperature in a fluid circuit, warming hydraulic fluid by circulating the fluid through portions of the fluid circuit bypassing a hydraulic motor, if sensed fluid temperature is below safe operating temperature, and supplying hydraulic fluid slowly through to the hydraulic motor once hydraulic fluid reaches safe operating temperature to gradually bring the motor up to desired speed so that full power operation can commence.

Warming the hydraulic fluid may involve maintaining open an electronically controlled hydraulic proportional valve disposed within the fluid circuit such that fluid is directed entirely to a bypass conduit. Supplying hydraulic fluid slowly to the hydraulic motor may involve gradually closing an electronically controlled hydraulic proportional valve disposed within the fluid circuit such that fluid is gradually conducted through a motor supply conduit in fluid communication with the hydraulic motor in order to gradually apply power to the motor.

Moreover, the method for operating the hydraulic control system may further include sensing hydraulic motor output characteristics and apportioning fluid flow to the hydraulic motor in order to maintain constant motor output characteristics. Sensing hydraulic motor output characteristics may involve sensing electrical output characteristics of a generator driven by the hydraulic motor. Apportioning may involve comparing sensed output characteristics with predetermined output characteristics, generating a control signal based on the comparison, and selectively controlling an electronically controlled hydraulic proportional valve to move incrementally within a valve chamber such that fluid is proportionally divided between a motor supply conduit in fluid communication with the hydraulic motor and a bypass conduit, which bypasses the hydraulic motor.

Further, the method of operating the hydraulic control system may include preventing over-temperature damage to the hydraulic system when sensed fluid temperature exceeds safe operating temperature. Preventing over-temperature damage may involve annunciating the existence of over-temperature conditions to an operator when a first high temperature is obtained, triggering a timer to begin counting down a specified time when a second high temperature is obtained, and bypassing all fluid flow to the motor when the timer has expired. Bypassing all fluid flow to the motor can involve opening an electronically controlled hydraulic proportional valve disposed within the fluid circuit such that fluid is directed entirely to a bypass conduit. Additionally, the method may include overriding the bypassing step upon receipt of an emergency override instruction from an operator to prevent shutdown and keep the system operating.

Furthermore, the method of operating the hydraulic control system may also include sensing fluid pressure in the fluid circuit, commencing operation of an auxiliary power source if sensed fluid pressure is sufficient by controlling a hydraulic proportional valve to meter fluid to the hydraulic motor, which drives the auxiliary power source, and ceasing operation of an auxiliary power source if sensed fluid pressure is deficient by fully opening the proportional valve to bypass all fluid flow to the motor.

Still another aspect of the invention is to provide annunciation of auxiliary power source output characteristics.

Still yet a further aspect of the invention is that acceleration of the auxiliary power source from the stopped condition, as well as cold temperature condition, be gradual.

These and other aspects, objects, features and advantages of the present invention will become more clearly understood and appreciated from a review of the following detailed description of the preferred embodiments and appended claims, and by reference to the accompanying drawings.

BRIEF DESCRIPTION OF THE DRAWINGS

The features of the present invention which are believed to be novel are set forth with particularity in the appended claims. The present invention, both as to its organization and manner of operation, together with further object and advantages thereof, may best be understood with reference to the following description, taken in connection with the accompanying drawings in which:

DETAILED DESCRIPTION OF THE PREFERRED EMBODIMENT(S)

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Figure 1:
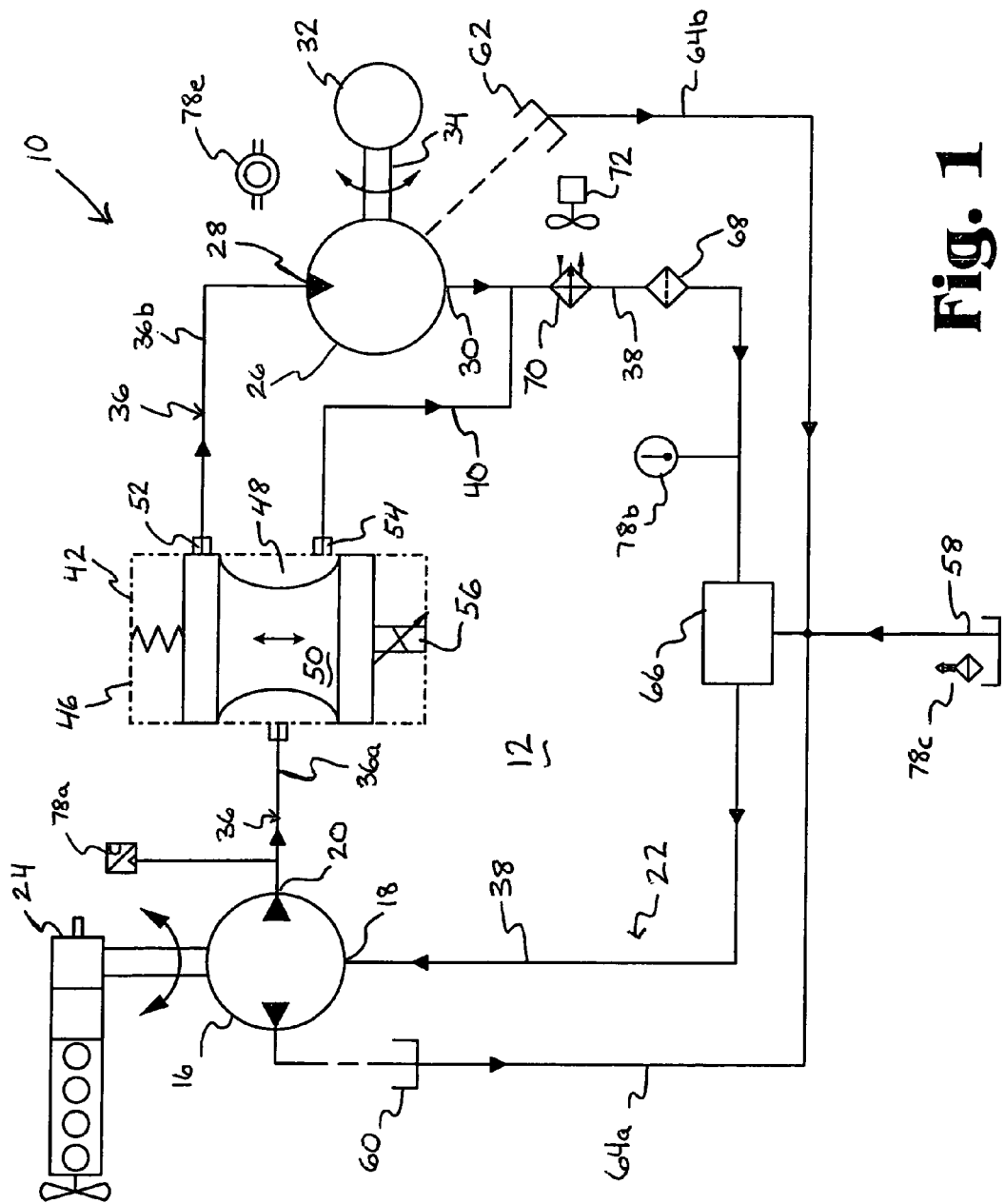
FIG. 1 is a schematic diagram of a hydraulic circuit exhibited in an exemplary control system according to an aspect of the present invention.
Figure 2:
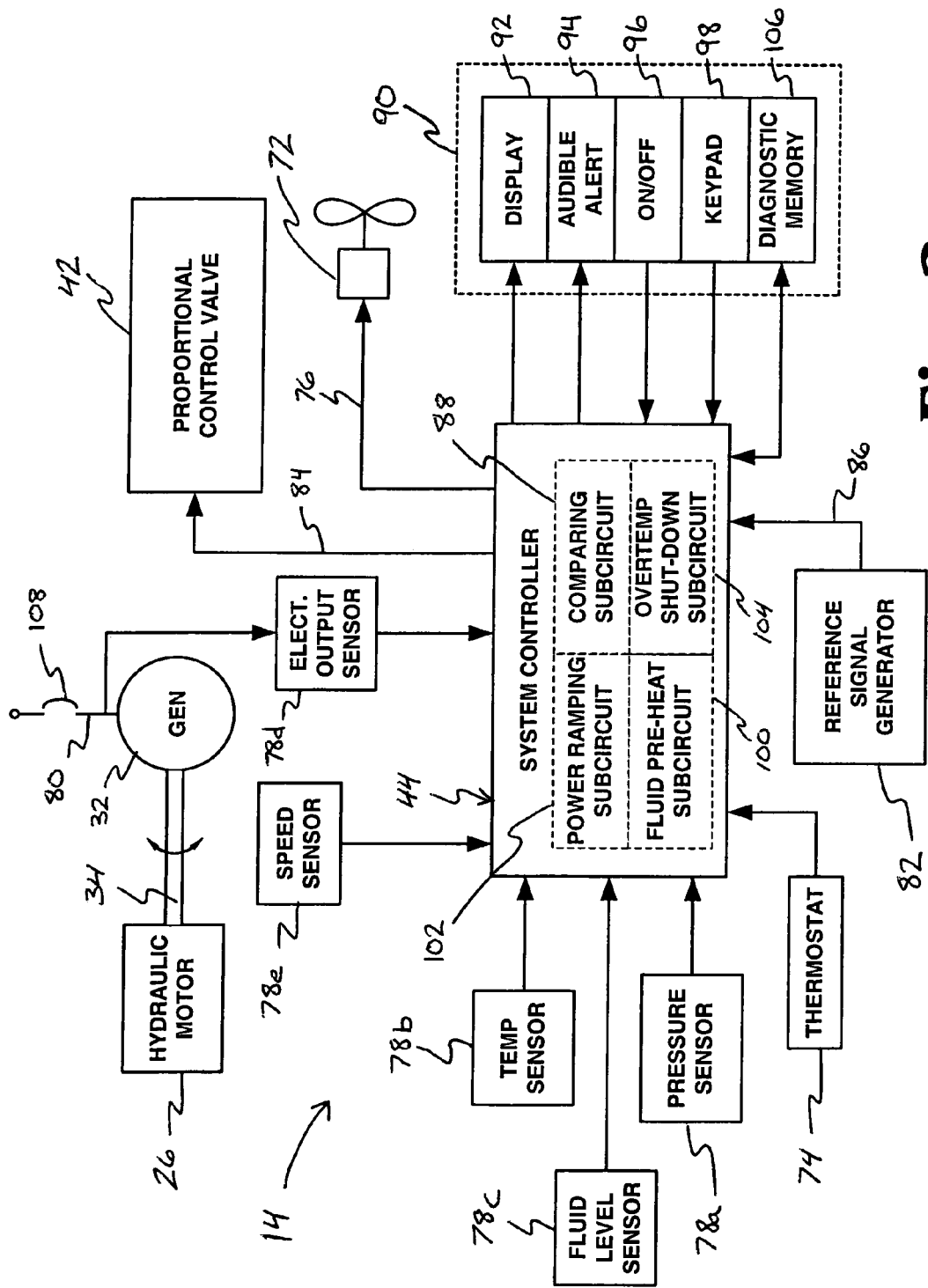
FIG. 2 is a schematic diagram of an alternate hydraulic circuit exhibited in an exemplary control system according to an aspect of the present invention.

A hydraulic control system 10, according to an aspect of the present invention, is illustrated in FIGS. 1 and 2. FIG. 1 generally depicts a hydraulic circuit 12 for the hydraulic control system 10, while FIG. 2 generally depicts a control circuit 14 for the hydraulic control system 10.

Referring first to FIG. 1, the hydraulic circuit 12 of the system 10 is powered by a hydraulic pump 16, having an inlet 18 for receiving fluid for pumping and an outlet 20 for discharging pumped fluid under pressure. The hydraulic pump 16 can be a variable displacement type pump, a fixed displacement type pump, or the like, for pumping pressurized fluid throughout a fluid circuit 22. The hydraulic pump 16 can be driven by a primary power source 24, such as a vehicle power take-off (PTO), belt drive, gasoline engine, diesel engine, or any similar input. A hydraulic motor 26, having an inlet 28 for receiving fluid under pressure and an outlet 30 for discharging spent fluid, can be disposed within the hydraulic circuit 12, as shown. The hydraulic motor 26 drives an auxiliary power source 32, which provides electrical or mechanical power to vehicle loads or devices (not shown). For example, the auxiliary power source 32 can be an AC generator, a mechanical drive system, or other source requiring constant rotational speed. The hydraulic motor 26 can be drivably connected to the auxiliary power source 32 through a shaft 34 (as shown in FIGS. 1 and 2), or a belt or other means of power transmission (not illustrated). Moreover, the hydraulic motor 26 can be a fixed displacement gear type motor, vane type motor, piston type motor, or the like.

The fluid circuit 22 can include a supply conduit 36, a return conduit 38, and a bypass conduit 40. The supply conduit 36 can be divided into at least two sections—a valve supply conduit 36a and a motor supply conduit 36b. The supply conduit 36 conducts fluid discharged by the pump 16 to the motor 26, while the return conduit 38 returns fluid discharged by the motor 26 to the pump 16. The bypass conduit 40, meanwhile, can be disposed in the fluid circuit 22 to conduct fluid discharged by the pump 16 directly to the return conduit 38, bypassing the motor 26, where the fluid is subsequently returned to the pump 16.

The system 10 preferably includes a proportional control valve assembly 42, such as an electro-hydraulic servo control valve assembly, controlled by a system controller 44 (shown in FIG. 2). The proportional control valve assembly 42 can be disposed serially with respect to the supply conduit 36 such that it is interposed between the outlet 20 of the pump and the inlet 28 of the motor. The control valve assembly 42 may include a housing 46 generally enclosing a valve chamber 48. A valve 50, which shuttles back and forth between an open position and a closed position, may be disposed within the valve chamber 48. The control valve assembly 42 may further include a first fluid passage 52 and a second fluid passage 54. Further, the control valve assembly 42 can be disposed within the hydraulic circuit 12 such that the first fluid passage 52 is in fluid communication with the valve chamber 48 and the motor supply conduit 36b, while the second fluid passage 54 is in fluid communication with the valve chamber 48 and the bypass conduit 40. A solenoid 56 or other electronic or electromechanical device can be drivably connected to the valve 50 for selectively moving the valve 50 incrementally within the valve chamber 48 from the open position to the closed position. The solenoid 56 can be in electrical communication with the system controller 44, which drives the solenoid 56. Accordingly, the system controller 44 can communicate with the control valve assembly 42 such that the valve 50 selectively closes and opens the first fluid passage 52 and the second fluid passage 54, thereby dividing fluid flow proportionally therebetween.

As the valve 50 divides the flow of hydraulic fluid between the first fluid passage 52 and the second fluid passage 54, the fluid can be correspondingly directed to the motor supply conduit 36b and the bypass conduit 40, respectively. Fluid directed to the motor supply conduit 36b may be supplied to, and discharged by, the motor 26 for powering the auxiliary power source 32 before returning to the pump 16 via the return conduit 38. Fluid directed to the bypass conduit 40 can bypass the motor 26 completely as it is steered immediately to the return conduit 38, without being supplied to the motor 26, for restoring to the pump 16.

Figure 3:
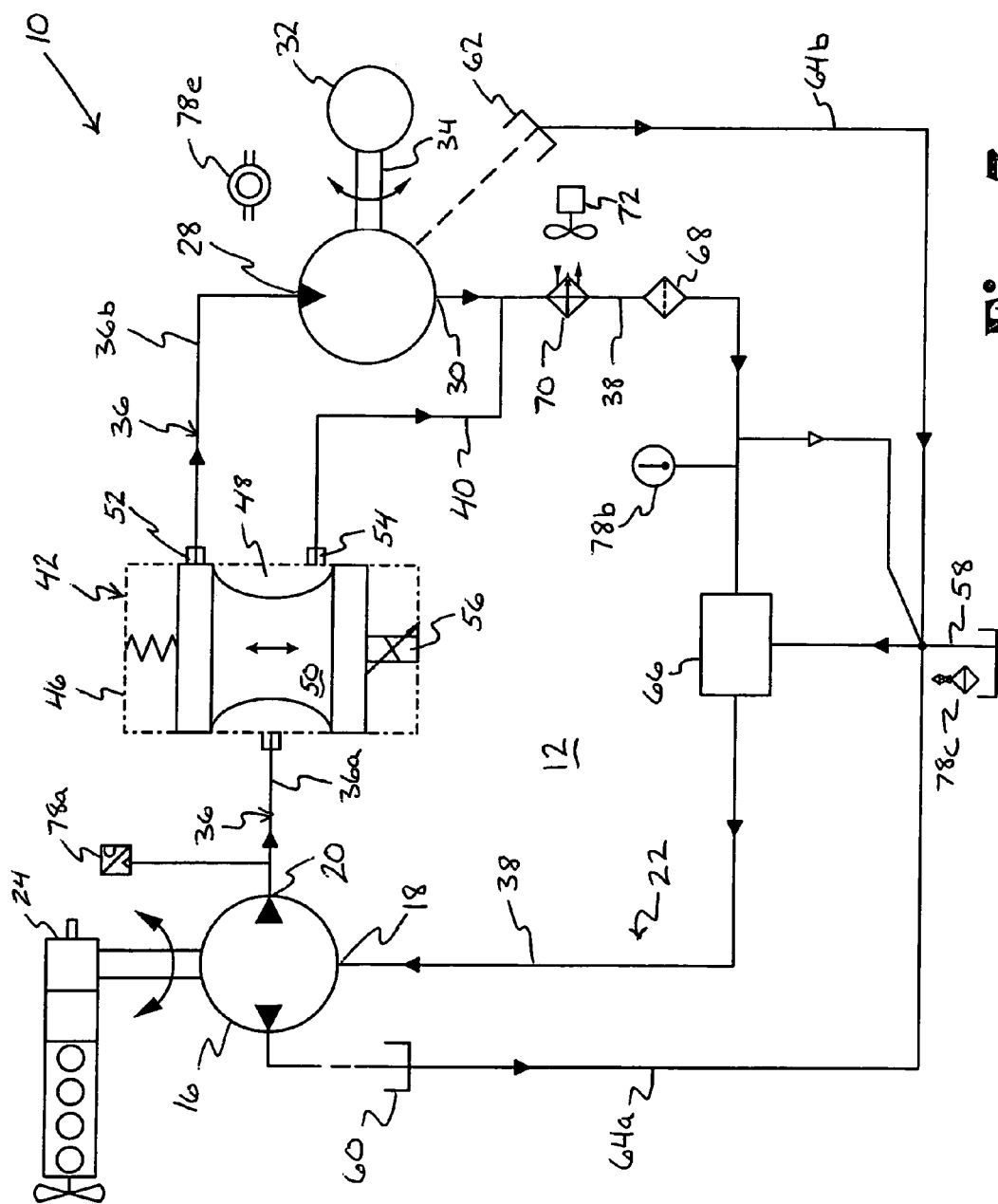
FIG. 3 is a block diagram of a control circuit according to an aspect of the present invention.

Optionally, the hydraulic circuit 12 may include a fluid reservoir 58 and a pump case drain 60 disposed at the pump 16, a motor case drain 62 disposed at the motor 26, or both. The fluid reservoir 58 can be in fluid communication with the fluid circuit 22 and maintains hydraulic fluid on reserve that can be introduced to the pump 16 via the return conduit 38. In an embodiment of the present invention, possible case drain flow from the pump 16 and the motor 26 can be directed back to the fluid reservoir 58 through drain conduits 64a-b (as illustrated in FIG. 3). Fluid flow in the return conduit 38 can be directed through a venturi boost 66, where fluid from the fluid reservoir 58 may be drawn into the return conduit 38 to replace that lost from the case drain flow, and supplied back to the pump 16. Alternatively, the drain conduits 64a-b can be disposed in the fluid circuit 22 such that case drain flow can be pulled directly to the return conduit 38 by the venturi boost 66, without first being directed to the fluid reservoir 58 (as shown in FIG. 1).

Additionally, the hydraulic circuit 12 may also include a fluid filter 68 and a fluid cooler 70. The fluid filter 68 and the fluid cooler 70 are preferably disposed serially with respect to the return conduit 38. However, it is to be understood that the fluid filter 68 and fluid cooler 70 can be disposed anywhere within the fluid circuit 22 without departing from the scope of the present invention. Impurities introduced into the hydraulic fluid as it gets cycled through the fluid circuit 22 can be filtered by the fluid filter 68. The fluid cooler 70, on the other hand, can cool fluid that passes therethrough. Accordingly, the fluid cooler 70 may include a heat exchanger (not separately shown) for dissipating heat to ambient air, an electrically operated fan 72 disposed adjacent the heat exchanger for forcing ambient air through the heat exchanger, and a thermostat 74 (not separately shown in FIG. 1) which controls fan operation when fluid contained within the fluid cooler 70 exceeds a predetermined temperature. The thermostat 74 can directly control the fan 72, or, alternatively, the thermostat 74 can control fan operation through the system controller 44. For example, the thermostat 74 and the fan 72 may be in electrical communication with the system controller 44. The system controller 44 may receive temperature readings of the fluid in the fluid cooler 70 from the thermostat 74. Correspondingly, the system controller 44 can operate the fan 72 by transmitting a fan control signal 76 to the fan 72 when fluid contained within the fluid cooler 70 exceeds the predetermined temperature.

The system 10, according to an aspect of the present invention, may also include a pressure sensor 78a, a temperature sensor 78b, a fluid level sensor 78c, an electrical output 78d (FIG. 2 only), and a speed sensor 78d, collectively referred to as system control sensors 78. Each of the control sensors 78 can be provided as part of the control circuit 14, shown in FIG. 2, and are configured to provide control inputs to the system controller 44. The control sensors 78 can be deployed throughout the system 10 to measure system vitals and assure the auxiliary power source 32 is driven at constant speeds.

Referring back to FIG. 1, the pressure sensor 78a can be disposed along the valve supply conduit 36a proximate the pump 16 to sense hydraulic pressure. However, it is to be understood that there are many other locations in the fluid circuit 22 for positioning the pressure sensor 78a so long as it can accurately sense that the pump 16 is operating. Similarly, the temperature sensor 78b can be disposed along the fluid circuit 22 to monitor hydraulic fluid temperature. The temperature sensor 78b can be separate from the thermostat 74 and thus provide separate input to the system controller 44, or, alternatively, the temperature sensor can be the same as the thermostat. The fluid level sensor 78c can be disposed within the fluid reservoir 58 to monitor the level of hydraulic fluid within the reservoir 58. If the fluid level becomes low, the system controller 44 may announce a tell-tale alarm to the operator. If the fluid level becomes extremely low, the system controller 44 may cause the system 10 to shut down entirely to prevent damage to the pump 16.

In an embodiment of the present invention, the auxiliary power source 32 can be an AC generator. Accordingly, the electrical output 78d can be a current sensor, voltage sensor, or both for monitoring the generator's operating characteristics, including current, voltage and frequency. The electrical output 78d can be connected to output conductors 80 of the generator to sense the generator operating parameters. Alternatively, the speed sensor 78d may be provided to monitor rotational speed of the motor 26 and the shaft 34, by sensing each revolution of the shaft 34, in order to provide controlled input to the system controller 44 relating to operation of the hydraulic motor 26.

Referring now to FIG. 2, the control circuit 14 will be described in further detail with reference to an AC generator as the driven auxiliary power source 32, although other applications referred to in the detailed description are also possible. As previously described, the control circuit 14 may include the system controller 44 and one or more of the control sensors 78, as well as a reference signal generator 82. The system controller 44 can be a programmable controller having a microprocessor (not separately shown) that implements control algorithms for the control of the generator output, namely voltage and frequency. The system controller 44 controls the generator output by applying a control output signal 84 to the proportional control valve assembly 42, directing the valve assembly 42 to meter fluid, and hence power, to the motor 26 for driving the generator. The system controller 44 varies the power supplied to the hydraulic motor 26 through the use of the control output signal 84. Accordingly, the control output signal 84 can be a pulse-width modulated voltage waveform or a variable DC output voltage applied to the solenoid 56 of the valve assembly 42.

Vehicles today often rely on sensitive and delicate electronics equipment, wherein only the cleanest of power is acceptable for operation. Very little variance in the output frequency of an AC generator is tolerable in order to operate various devices such as computers and communications equipment. Merely close frequency output in relation to desired frequency output is not good enough. Accordingly, it may be desirable to compare actually frequency with a predetermined frequency, rather than merely relying on sensed motor speed as an indirect method of determining the generator's output characteristics. Of course, it is to be understood that sensing rotational speed of the motor 26 may be adequate in certain applications. Nonetheless, in an embodiment of the present invention, the electrical output 78d can be electrically coupled to the generator. The reference signal generator 82 can be in electrical communication with the system controller 44 and generates a reference signal 86 indicative of the predetermined output frequency. The system controller 44 may include a comparing subcircuit 88 that implements control algorithms for comparing sensed output frequency with the reference signal 86. The comparing subcircuit 88 can then generate and transmit control output signals for controlling the valve assembly 42 such that the supply of fluid conducted to the motor 26 be sufficient to maintain desired generator output frequency.

The system controller 44, constructed in accordance with an exemplary embodiment of the present invention, may also implement additional control algorithms for the electrical or mechanical system's output functions in response to load variations, physical changes in the electrical or mechanical system's operating environment or equipment, and communications from the user or other electronic modules. As the load on the electrical or mechanical system is increased or decreased, or the hydraulic fluid viscosity changes due to temperature fluctuations and such, or the operating characteristics of the pump 16, motor 26, or the valve assembly 42 change due to ambient conditions or wear, the system controller 44 can further adjust outputs to maintain consistent operation of the electrical or mechanical system.

The control circuit 14 may further include an operator interface module 90 enabling an operator of the system 10 to communicate with the system controller 44 through a bi-directional asynchronous serial communications interface. The interface module 90 can display system operating parameters through an information display 92. As non-limiting examples, the operating parameters displayed may include output voltage, frequency, current, hydraulic fluid temperature, total operating hours, and the like. The interface module 90 can also display or announce alarm conditions or faults detected by the system controller 44 and permit the operator to interact with the system controller 44 and influence the operation of the auxiliary power source 32. The alarm conditions can be announced by an audible alert 94 included in the interface module 90. The operator may also influence the configuration of the system controller 44. For example, the operator may turn the hydraulically powered system 10 on or off through an ON/OFF switch 96. Moreover, the operator may configure the system controller 44 to automatically turn the auxiliary power source 32 on when sufficient hydraulic pressure is detected. Further, the operator can instruct the system controller 44 to purge air from the hydraulic lines, and configure the maximum expected output values to be controlled by the system. The operator communicates with the system controller 44 through a keypad 98 disposed in the interface module 90. Furthermore, multiple interface modules may be linked together to add multiple operator interfaces if desired.

When the electrical or mechanical system to be driven is idle or shut down, the valve 50 can be normally fully open, directing all fluid flow into the bypass conduit 40, and depriving the motor 26 of power. At the operator's request through the interface module 90, power can be metered to the motor 26 by incrementally closing the valve 50, which begins diverting some proportional amount of fluid flow to the motor 26. The more the valve 50 is closed, the more power can be provided to the motor 26, thereby activating the electrical or mechanical system.

Alternatively, the application of hydraulic pressure to the fluid circuit 22 may be interpreted by the system controller 44 as a command to commence electrical or mechanical system operation. The operator may wish to configure the system controller 44 to automatically power the auxiliary power source 32 when the pump 16 is operating. If pressure sufficient for system operation is detected by the pressure sensor 78a, system operation can automatically commence without further instruction from the operator. On the other hand, if the hydraulic pressure falls below that required for system operation, the system controller 44 can direct the proportional valve 50 to open fully, diverting all fluid flow into the bypass conduit 40, thereby shutting down motor operation.

The system controller 44 may further include a fluid pre-heating subcircuit 100. If the temperature sensor 78b detects that hydraulic fluid in the system 10 is too cold for normal operation, the system controller 44 can implement the fluid pre-heating subcircuit 100 to warm the fluid to a safe operating temperature. The fluid pre-heating subcircuit 100 can generate control output signals for controlling the proportional valve assembly 42 such that fluid bypasses the hydraulic motor 26 entirely until safe fluid operating temperature is obtained, avoiding damage to the mechanical components. The system controller 44 can hold the proportional valve 50 fully open to circulate the hydraulic fluid through the bypass conduit 40. Normal mechanical friction will warm the fluid until it reaches a first predetermined temperature, at which point the proportional valve 50 can be opened only enough to pass the warming fluid slowly through the motor 26. Normal mechanical friction will warm the fluid further until it reaches a second predetermined temperature, at which point full power operation can commence.

The application of the fluid pre-heating subcircuit 100 can be incredibly advantageous in extremely low temperatures where the hydraulic fluid can partially congeal. If fluid were permitted to pass through the motor 26 immediately, prior to frictional warming through the bypass conduit 40, lumps of congealed fluid can momentarily obstruct the motor gears causing the motor 26 to briefly decelerate and then accelerate. The deceleration and acceleration caused by lumps in the fluid passing through the motor gears occurs almost instantaneously, resulting in large voltage spikes at the output of the auxiliary power source 32 (in the case of a generator). The duration of the voltage spike is very abrupt and the magnitude of the voltage spike can be sufficient to damage various electrical loads. The fluid pre-heat subcircuit 100 substantially minimizes this occurrence reducing warranty claims and the costs associated with, while greatly increasing customer satisfaction and good will.

Once pressure and temperature are sufficient, full system operation can begin. In order to bring the system 10 up to power, the system controller 44 may utilize a power ramping subcircuit 102. The power ramping subcircuit 102 can enable the system controller 44 to slowly close the proportional valve 50 so as to gradually apply power to the hydraulic motor 26. This gradual application of power allows the system 10 to gently overcome inertial effects, greatly reducing wear and increasing system component lifetimes.

Figure 4:
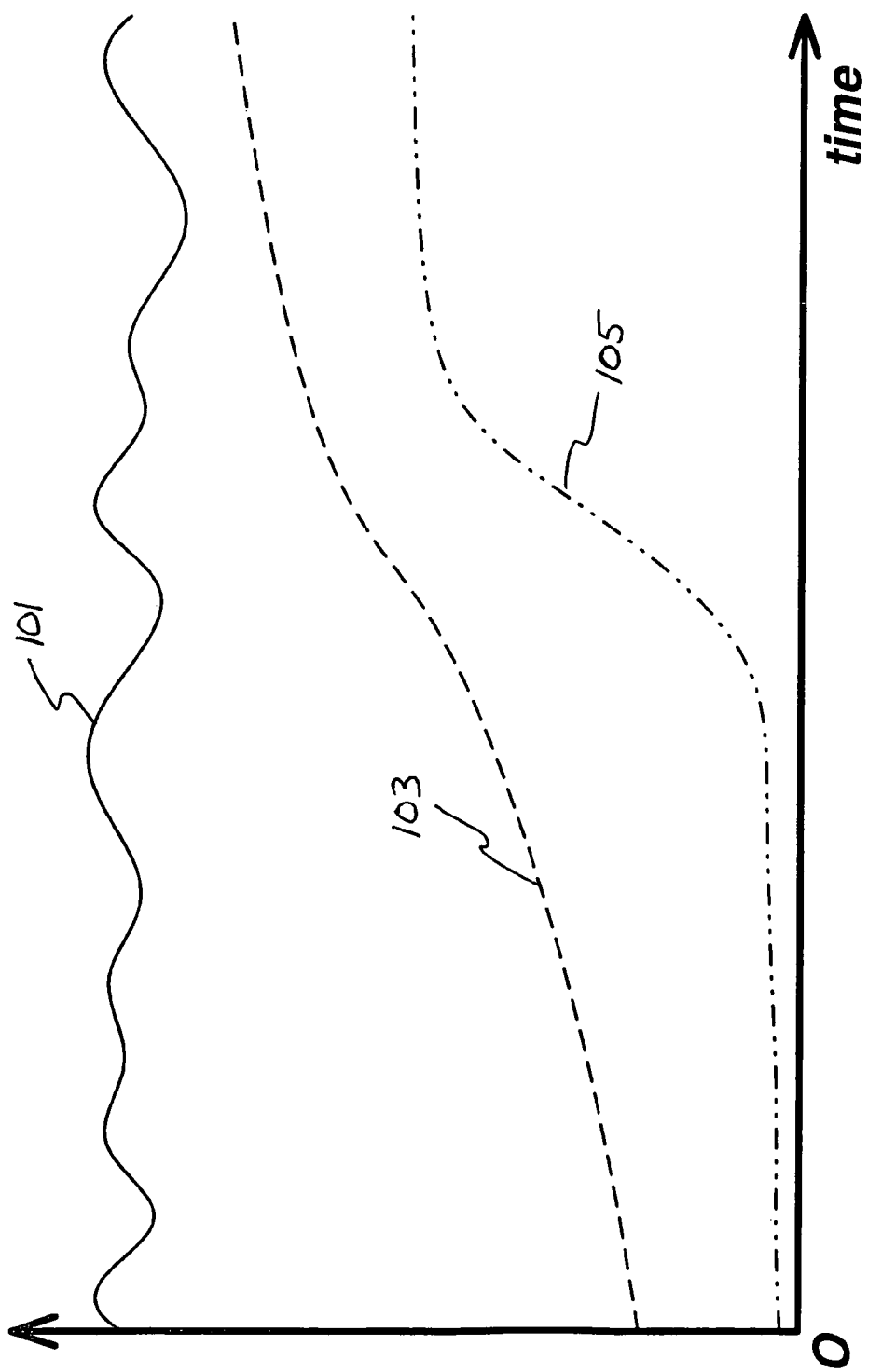
FIG. 4 is a graph generally displaying system characteristics during cold start operation according to an aspect of the present invention.

With reference now to FIG. 4, a graphical representation of cold start operation parameters of the system, utilizing the fluid pre-heating subcircuit 100 and the power ramping subcircuit 102, is illustrated. Pump speed 101 generally depicts revolutions per minute (RPMs) of the hydraulic pump 16 over time at initial system cold temperature start-up. Pump speed 101 can fluctuate over time as the vehicle engine speed fluctuates. Fluid temperature 103 generally depicts temperature of the fluid in the fluid circuit 22 during cold start operation. At cold start, hydraulic fluid can bypass the motor 26 until it warms to a sufficient temperature, at which point fluid is slowly diverted to the motor 26 to gradually supply power to the system. During this ramp-up, fluid temperature 103 can increase further permitting full system operation to begin. Motor speed 105 generally depicts operation of the motor (in RPMs) during cold start. The motor 26 can get little or no power, while the fluid warms as it circulates through the bypass conduit 40. Once a desired temperature is obtained, motor speed 105 ramps up as fluid is gradually supplied to the motor 26. Once full system operation commences, motor speed 105 remains substantially constant, despite fluctuations in engine speed and hence pump speed 101.

Further, the system controller 44 may include an overtemperature shut-down subcircuit. When the temperature of the hydraulic fluid exceeds safe operating conditions, the overtemperature shut-down subcircuit 104 can notify the operator of the electrical or mechanical system that excessive temperatures are being detected, and action may be required to prevent damage to the system 10. When the temperature exceeds yet another temperature threshold, the overtemperature shut-down subcircuit 104 can start an internal timer. If the timer expires, the proportional valve 50 may be fully opened by the overtemperature shut-down subcircuit 104, bypassing all fluid flow and shutting down the hydraulic system 10 unless the operator issues an emergency override instruction through the keypad 98 to prevent the shutdown and keep the electrical or mechanical system operating.

The system controller 44 may also have the ability to record all abnormal conditions and faults to a diagnostic memory 106. The faults can be retrieved from the diagnostic memory 106 by the operator and displayed by the interface module 90 to evaluate the conditions seen by the system 10 and assist in any necessary troubleshooting. Recorded conditions may include, but are not limited to, valve voltage faults, valve current faults, over current faults, current sensing faults, temperature sensing faults, ground faults, number of over temperature overrides, fan faults, voltage sensing faults, hours run with over temperature, highest recorded frequency, highest recorded voltage, highest measured current, highest measured temperature, hours run with overcurrent, hours on oil filter, calibration values, maximum current values, and total hours.

Yet another advantage of the hydraulic control system 10, according to the present invention is that it can be a self-contained system that can also be readily retrofit to a vehicle having a power take of, engine driven belt drive, or any other power supply source. Moreover, the system 10 may include a circuit breaker 108 as yet another protective feature. The circuit breaker 108 may be located in series with output conductors 80 connected to output terminals of the generator. The circuit breaker 108 can operate conventionally by opening an external circuit (not shown), which is connected to the conductors to conduct electrical power to powered equipment.

A general overview of the operation of the hydraulic system electronic control, according to a certain embodiment of the present invention, is provided below. The system controller 44 can sense adequate operating pressure in the fluid circuit 22. If the system controller 44 does not automatically interpret sufficient pressure as a command to commence operation, it can wait to receive a command signal from an input, operator, or other electronic module to activate the hydraulically powered mechanical or electrical system. The system controller 44 can then check the status and values of the control inputs to ensure operation will be safe and effective. If the hydraulic fluid temperature is too low, the fluid pre-heat subcircuit 100 can cause the fluid to warm to safe operating temperatures. The system controller 44 can then gradually apply power to the hydraulic motor 26 by slowly closing the proportional valve 50, according to the power ramping subcircuit 102. Appropriate control signals can be applied by the system controller 44 to outputs in response to the control inputs to achieve the desired control and function of the system 10. If the hydraulic fluid temperature becomes too high for safe operation, the overtemperature shut-down subcircuit 104 can be implemented to shut down the operation of the electrical or mechanical system. The system's operating parameters may be sent via serial communications using a proprietary protocol to the operator interface module 90 or other electronic module. If a command is received from the operator or other electronic module to cease operation, or the hydraulic pressure falls below that required for operation, the system controller 44 can shut down the electrical or mechanical system by fully opening the proportional valve 50, bypassing all hydraulic fluid flow to the motor 26.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hydraulic control system for driving an auxiliary power source, located aboard a motor vehicle having a primary power source, at constant speed despite fluctuations in rotational speed of the primary power source, the system comprising:
   a hydraulic pump drivably connectable to the primary power source, the hydraulic pump having an inlet for receiving fluid for pumping and an outlet for discharging pumped fluid under pressure;
   a hydraulic motor drivably connectable to the auxiliary power source, the hydraulic motor having an inlet for receiving fluid under pressure and an outlet for discharging spent fluid;
   a fluid circuit including a supply conduit for conducting fluid discharged by the pump to the motor, a return conduit for returning fluid discharged by the motor to the pump, and a bypass conduit for conducting fluid discharged by the pump directly to the return conduit, bypassing the motor, and returning fluid to the pump;
   a proportional control valve assembly disposed serially with respect to the supply conduit and interposed between the outlet of the pump and the inlet of the motor, the control valve assembly having a housing including a valve chamber, a valve disposed within the valve chamber for apportioning the flow of fluid between the supply conduit and the bypass conduit, a solenoid drivably connectable to the valve for selectively moving the valve incrementally within the valve chamber from an open position to a closed position, a first fluid passage in fluid communication with the valve chamber and the supply conduit going to the motor, a second fluid passage in fluid communication with the valve chamber and the bypass conduit, wherein the valve selectively closes and opens the first fluid passage and the second fluid passage proportionally dividing the flow of fluid therebetween; and
   a control circuit in electrical communication with the valve assembly for controlling the valve assembly and hence the fluid flow within the first fluid passage to the motor supply conduit and the second fluid passage to the bypass conduit.

2. The system according to claim 1, wherein the control circuit comprises:
   an electrical output sensor electrically coupled to the auxiliary power source for determining output frequency of the auxiliary power source;
   a reference signal generator for generating a reference signal indicative of a predetermined output frequency; and
   a comparing subcircuit for comparing sensed output frequency with the reference signal, and for generating a control signal controlling the valve assembly such that the supply of fluid conducted to the supply conduit be sufficient to maintain desired output frequency.

3. The system according to claim 1, wherein the control circuit comprises:
   a speed sensor for determining rotational speed of the hydraulic motor;
   a reference signal generator for generating a reference signal indicative of a predetermined rate of rotation; and
   a comparing subcircuit for comparing sensed rotational speed of the motor with the reference signal, and for generating a control signal controlling the valve assembly such that the supply of fluid conducted to the supply conduit be sufficient to maintain desired rotational speed.

4. The system according to claim 1, wherein the control valve assembly is an electro-hydraulic servo control valve assembly.

5. The system according to claim 1, wherein the control circuit further comprises a pressure sensor for determining sufficient hydraulic pressure for system operation, the pressure sensor causes system operation to begin when hydraulic pressure is sufficient and causes system operation to shut down when hydraulic pressure is deficient.

6. The system according to claim 1, wherein the control circuit comprises:
   a temperature sensor disposed in the fluid circuit for sensing hydraulic fluid temperature; and
   a system controller having a fluid pre-heating subcircuit for generating a control signal controlling the valve assembly such that fluid bypasses the hydraulic motor entirely until safe fluid temperature is obtained.

7. The system according to claim 6, wherein the system controller further comprises a power ramping subcircuit for generating a control signal controlling the valve assembly when sufficient fluid temperature is obtained such that power is supplied gradually to the hydraulic motor.

8. The system according to claim 6, wherein the system controller further comprises an overtemperature shutdown subcircuit for generating a control signal controlling the valve assembly when fluid temperature becomes too hot for safe operation such that fluid bypasses the hydraulic motor, shutting down the auxiliary power source.

9. The system according to claim 8, wherein the control circuit further comprises an emergency override accessible by an operator for instructing the system controller to continue system operation when unsafe operating conditions exist.

10. The system according to claim 1, further comprising an interface module having a display in electrical communication with the control circuit for displaying real time system operating characteristics to an operator.

11. The system according to claim 10, further comprising diagnostic memory that records abnormal operating conditions and faults for subsequent retrieval by the operator through the display.

12. The system according to claim 10, wherein fault or alarm conditions are displayed by the interface module.

13. The system according to claim 1, wherein the control circuit comprises a fluid level sensor disposed in a fluid reservoir for generating a fluid level fault when the fluid level falls below a first minimum fluid level and a control signal shutting down the system when the fluid level falls below a second minimum level.

14. The system according to claim 1, wherein the fluid circuit further includes a hydraulic fluid filter disposed serially with respect to the return conduit.

15. The system according to claim 1, wherein the fluid circuit further includes a hydraulic fluid cooler disposed serially with respect to the return conduit, an electrically operated fan disposed adjacent the hydraulic fluid cooler to pass ambient air through the hydraulic fluid cooler, and a thermostat disposed proximate the hydraulic fluid cooler to operate the fan when fluid contained within the hydraulic fluid cooler attains temperatures exceeding a predetermined temperature.

16. The system according to claim 15, wherein the fluid circuit further includes a hydraulic fluid filter disposed serially with respect to the return conduit, and a housing enclosing the hydraulic motor, the control valve assembly, the fluid filter, the fluid cooler, and a fluid reservoir, wherein the hydraulic motor, the control valve assembly, the fluid filter, the fluid cooler, and the fluid reservoir are readily installed as a unit on the chassis of a motor vehicle.

17. The system according to claim 1, wherein the auxiliary power source is a generator.

18. The system according to claim 17, wherein the generator has output conductors and a circuit breaker for opening a circuit connected to the output conductors.

19. The system according to claim 1, wherein the fluid circuit further comprises a fluid reservoir and a venturi boost for drawing fluid from the fluid reservoir into the fluid circuit.

* * * * *

UNITED STATES PATENT AND TRADEMARK OFFICE
CERTIFICATE OF CORRECTION

PATENT NO. : 7,053,498 B1
APPLICATION NO. : 11/037984
DATED : May 30, 2006
INVENTOR(S) : Mario P. Boisvert et al.

It is certified that error appears in the above-identified patent and that said Letters Patent is hereby corrected as shown below:

On the title page, item [73]:
Assignee: "Wartron Corporation" should be -- Nartron Corporation--.

Signed and Sealed this

Fifth Day of September, 2006

JON W. DUDAS
*Director of the United States Patent and Trademark Office*